United States Patent [19]

List, deceased et al.

[11] Patent Number: 4,941,130
[45] Date of Patent: Jul. 10, 1990

[54] MULTI-SPINDLE KNEADING MIXER WITH FIXED KNEADING COUNTERELEMENTS

[75] Inventors: Heinz List, deceased, late of Pratteln, by Jorg List, executor; Walther Schwenk, Kaiseraugust; Alfred Kunz, Witterswill, all of Switzerland

[73] Assignee: List AG, Pratteln, Switzerland

[21] Appl. No.: 311,110

[22] Filed: Feb. 15, 1989

[30] Foreign Application Priority Data

Feb. 16, 1988 [CH] Switzerland .................. 00550/88

[51] Int. Cl.⁵ ............................................. B01F 7/04
[52] U.S. Cl. ........................................ 366/99; 366/149; 366/307; 366/309; 366/313
[58] Field of Search ................................... 366/65–67, 366/75, 96, 97, 99, 144, 149, 279, 297, 292, 293, 302–307, 309, 299, 312, 313, 315, 317, 325, 301; 422/225

[56] References Cited

U.S. PATENT DOCUMENTS

| | | | |
|---|---|---|---|
| 2,095,907 | 10/1937 | Beken | 366/298 |
| 3,687,422 | 8/1972 | List | 366/299 |
| 4,053,144 | 10/1977 | Ellwood | 366/97 |
| 4,597,672 | 7/1986 | Neier et al. | 366/186 |
| 4,650,338 | 3/1987 | List et al. | 366/85 |
| 4,752,139 | 6/1988 | Hauck | 366/312 |
| 4,801,433 | 1/1989 | Yamanaka et al. | 366/299 |
| 4,826,324 | 5/1989 | Kunz et al. | 366/99 |

Primary Examiner—Timothy F. Simone
Attorney, Agent, or Firm—Bachman & LaPointe

[57] ABSTRACT

A multi-spindle kneading mixer with at least two intermeshing shafts, one of which is equipped with disk elements which are cleaned by a second agitator shaft, with intensive full mixing and kneading taking place at the same time, characterized in that fixed kneading counterelements are inserted in the housing for the purpose of an approximately complete cleaning of the two agitator shafts.

5 Claims, 2 Drawing Sheets

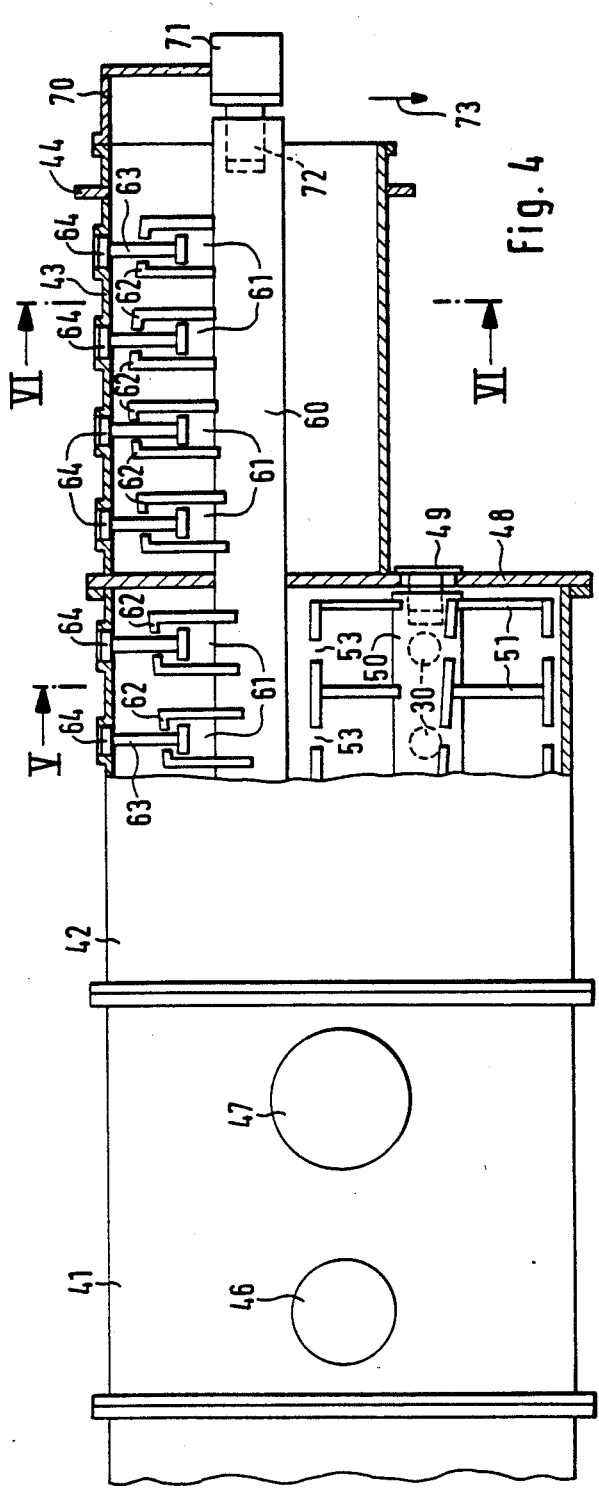
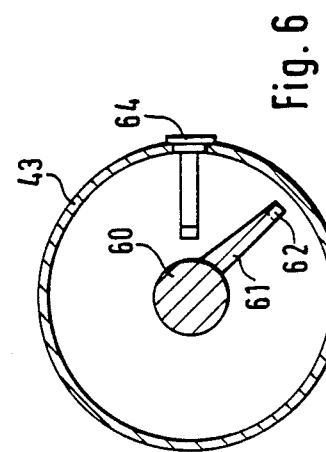
Fig. 6
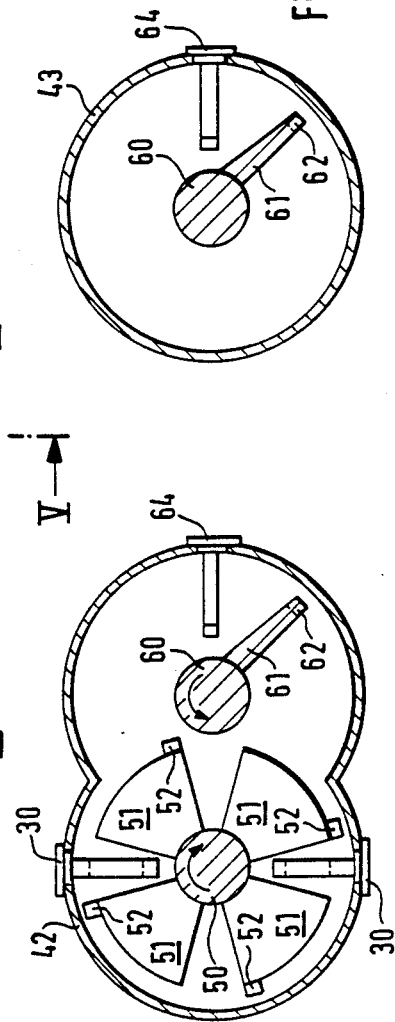
Fig. 5

4,941,130

MULTI-SPINDLE KNEADING MIXER WITH FIXED KNEADING COUNTERELEMENTS

BACKGROUND OF THE INVENTION

The invention relates to kneading mixer for performing mechanical, chemical and thermal processes.

There is a known multi-spindle mixing and kneading machine according to Swiss patent specification 506,322, and in this two axis-parallel shafts mesh with one another, one of these being equipped with radial disk elements arranged at uniform distances from one another and with axially aligned kneading bars fastened to these (disk shaft), while the second shaft has, as a kneading shaft, kneading elements which engage into the space between the disk elements and kneading bars of the disk shaft. The two shafts are coupled to one another in a specific speed ratio, so that, during the cleaning of the disks, the engagement of the kneading elements in each case sweeps over an involute area corresponding to the speed ratio. Between these involute areas, on the disks there are in each case unswept and therefore uncleaned disk parts.

SUMMARY OF THE INVENTION

According to the invention, this disadvantage is eliminated because the disks are additionally stripped by kneading counterelements which are fastened in the housing. At the same time, the mixing and kneading effect is made more intensive as result of an expedient shaping of these kneading counterelements.

BRIEF DESCRIPTION OF THE DRAWINGS

The invention is illustrated in the accompanying drawings, wherein:

FIG. 4 shows a top view of a kneading mixer with a housing represented partially in section and with a single-shaft outflow housing;

FIG. 5 shows a cross-section through the kneading mixer according to FIG. 4 and the line III—III, FIG. 6 shows a cross-section through the single-shaft housing of the kneading mixer along the line IV—IV of FIG. 5.

DETAILED DESCRIPTION

Figure 1:
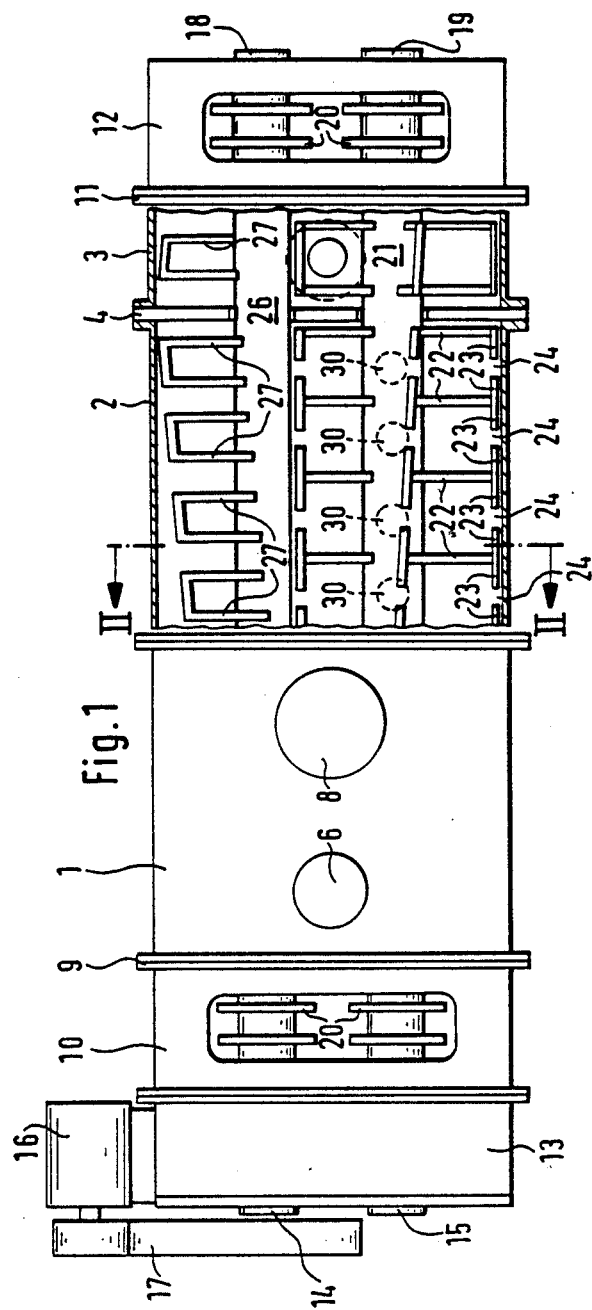
FIG. 1 shows a top view of a two-shaft kneading mixer with a housing represented partially in section.
Figure 3:
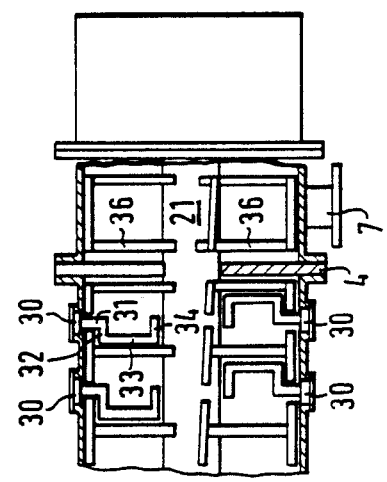
FIG. 3 shows a longitudinal section through the kneading mixer along the line II—II of FIG. 2.
Figure 2:
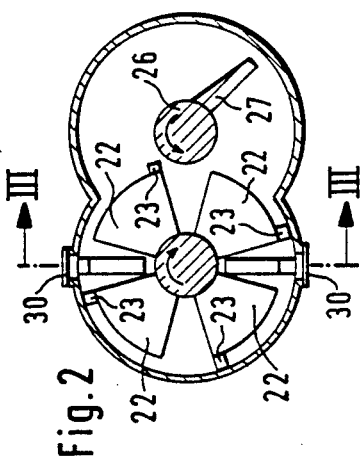
FIG. 2 shows a cross-section through the kneading mixer along the line I—I of FIG. 1.

For the sake of clear illustration, heating or cooling jackets and also the lines supplying the heating or cooling medium to the shafts and discharging them from these are not shown in any of the Figures. FIGS. 1, 2 and 3 illustrate a basic design of the subject of the invention. The working space comprises a three-part housing with an inflow part 1, a middle part 2 and an outflow part 3 which are connected to one another by means of flanges. Clamped in the flanged connection between the housing parts 2 and 3 is the level plate 4 which determines the level of product in the machine in a similar way to an overflow weir. 6 denotes the inflow connection for the product, 7 the outflow connection and 8 a vapor connection for the discharge of vapors and gases. The end walls 9 and 11 with the louvers 10 and 12 are likewise flanged to the housing. On the driving side, the gear 13 is flanged to the louver 10, together with the agitator-shaft mountings 14 and 15 and the drive obtained by means of an electric motor 16 and a V-belt assembly 17.

On the outflow side of the housing, the agitator shafts are supported in the bearings 18 and 19 of the louver 12. The shaft passages through the end walls 9 and 11 are sealed off by means of the glands 20. Arranged on the disk shaft 21 at uniform distances from one another in radial disk planes are disk elements 22, to the outside diameter of which the kneading bars 23 are attached. These kneading bars are arranged in such a way that the gaps 24 are obtained between them. The second axis-parallel kneading shaft 26 is equipped with the kneading frames 27 which engage between the disk shafts during the rotation of the two shafts counter to or with one another and which clean the disk elements, while at the same time ensuring an intensive kneading of the product. In this connection the kinematic cycle of movement is selected so that engagement takes place in involute form in a similar way to gear wheels.

The speed ratio between the two agitator shafts can be varied as desired. Normally, the kneading shaft 26 rotates four times faster than the disk shaft 21. The disk elements 22 are thus cleaned only over part surfaces according to the involute engagement. For the complete cleaning of the disks and shaft, therefore, according to the invention kneading counterelements 30 are inserted into the housing at locations where, because of the gaps between the kneading bars of the disk shaft 23, the inner wall of the housing is not swept by the kneading bars. Each of these kneading counterelements 30 in the form of kneading hooks comprises a radial support 31, an axial carrying arm 32, a disk scraper 33 and a shaft scraper 34. At the same time as the efficient cleaning of the disks, a greatly improved mixing and kneading effect between the disks is obtained, this being intensified as result of the special design of the hooks in a helical or oblique form. This kneading effect is also assisted by the passage of the kneading bars 23 through the kneading clearance which is formed by the axial arm 32 of the kneading hook and the inner wall of the housing. The cleaning by the kneading counterelements becomes especially effective if the disk surfaces are designed with only one passage gap.

The agitating and kneading elements in the outflow housing 3 are mostly frame-like in design, the radial parts of the frames being designed as scrapers for the level plate 4 or for the end wall 11.

The kneading bars 23 on the disk shaft and the outer axial kneading bars on the frames 27 of the kneading shaft are appropriately arranged on a helix which causes the product to be transported from the inflow 6 to the outflow 7.

FIG. 4, with the associated cross-sections in FIGS. 5 and 6, illustrates a version of the subject of the invention, in which the outflow part is designed with a cylindrical housing and with only one agitator and transport shaft. This version has advantages when the connecting material to a following appliance, for example a rotary furnace or a boiler, allows only a restricted diameter of the connecting flange.

The driving part of the machine is not shown in FIG. 4. It corresponds to the construction already illustrated in FIG. 1. The housing is divided into the portions 41 and 42 and the outflow housing 43. The housings 41 and 42 are designed in the form of a figure eight according to the cross-section of FIG. 5, while the outflow housing 43 has a cylindrical form according to the cross-section of FIG. 6. The flange 44 on the outflow housing 43 is the connecting flange to a following appliance. 46 denotes the filling connection for the product, and 47 the connection for drawing off steam and vapor. The plate 48 is the end plate for the disk-shaft housing, which in the region of the kneading shaft serves at the same time as a level plate.

The disk shaft 50 with the disk elements 51 and with the kneading bars 52 fastened to them corresponds essentially to the construction also shown in FIG. 1. Between the kneading bars 52 there are provided the gaps 53, into which engage the supports of the kneading elements 30 corresponding to the kneading elements 30 in FIGS. 1 to 3. 49 designates a bearing journal fastened to the end wall 48 by means of a flange and intended for supporting the shaft 50.

The kneading shaft 60 meshing with the disk shaft 50 is equipped with the kneading frame 61 which, as already described, engage in involute form into the disk shaft during rotation and clean this, with intensive full kneading taking place at the same time. The axial outer bars 62 of the kneading frames 61 are interrupted by a gap 63. Inserted into these gaps are the T-shaped hooks 64 which on the one hand clean the inner part of the kneading frame 61, but on the other hand prevent the product from corotating.

The helix, on which the kneading frames 61 together with the axial kneading bars 62 are arranged, is thereby effective for achieving good product transport.

70 denotes the cylindrical outflow housing with a bearing body 71 and a journal 72, by means of which the shaft 60 is mounted. The product leaves the kneading mixer at the outflow 73.

We claim:

1. A multi-spindle kneading mixer for performing mechanical, chemical and thermal processes, which comprises: a housing; at least two axis-parallel, rotating shafts within the housing; radial disk elements on one shaft having an outside diameter; axially aligned kneading bars fastened on the outside diameter of said disk elements, so that gaps exist therebetween; kneading frames on the second shaft and operative to clean the axially aligned kneading bars; kneading counterelements in the housing projecting into said gaps to clean said gaps, wherein the kneading counterelements are kneading hooks which clean the disk elements, increase the kneading effect, and roll the product between the disk elements; wherein intensive full kneading takes place simultaneously with cleaning.

2. A kneading mixer according to claim 1 wherein the kneading frames on the second shaft are axially aligned kneading frames and wherein said axially aligned kneading frames are interrupted by gaps, including second kneading counterelements in the housing projecting into the gaps between the axially aligned kneading frames.

3. A kneading mixer according to claim 2 wherein the second kneading counterelements in the housing are designed as T-shaped fingers.

4. A kneading mixer according to claim 1 wherein said housing is a double housing including a kneading zone and a discharge end, wherein said kneading zone merges at the discharge end into a cylindrical housing which is swept by only one shaft.

5. A kneading mixer according to claim 1 wherein said kneading hooks comprise a radial support, an axial carrying arm and a disk scraper.

* * * * *